United States Patent [19]

Hope et al.

[11] 4,295,590

[45] Oct. 20, 1981

[54] APPARATUS FOR PROCESSING PHOTOGRAPHIC MATERIALS

[76] Inventors: Henry F. Hope; Stephen F. Hope, both of 2421 Wyandotte Rd., Willow Grove, Pa. 19090

[21] Appl. No.: 158,248

[22] Filed: Jun. 10, 1980

[51] Int. Cl.$^3$ ........................ B65H 17/22; G03B 1/56

[52] U.S. Cl. ........................................ 226/183; 226/92; 226/189

[58] Field of Search ................. 226/183, 188, 189, 91, 226/92, 171; 74/421 R; 354/312-314, 319-322, 316, 339

[56] References Cited

U.S. PATENT DOCUMENTS

| | | | |
|---|---|---|---|
| 3,025,779 | 3/1962 | Russell | 95/94 |
| 3,067,919 | 12/1962 | Kunz | 226/188 |
| 3,072,310 | 1/1963 | Kunz | 226/188 |
| 3,147,090 | 9/1964 | Russell | 34/160 |
| 3,345,928 | 10/1967 | Krehbiel | 95/94 |
| 3,532,048 | 10/1970 | Hope | 95/94 |
| 3,656,676 | 4/1972 | Hope | 226/92 |
| 3,952,610 | 4/1976 | Hope | 74/421 R |
| 3,989,176 | 11/1976 | Hope | 226/189 |
| 4,026,451 | 5/1977 | Hope | 226/91 |
| 4,079,635 | 3/1978 | Hope | 74/421 R |
| 4,118,998 | 10/1978 | Hope | 74/421 R |

*Primary Examiner*—Edward J. McCarthy
*Attorney, Agent, or Firm*—Zachary T. Wobensmith, 2nd; Zachary T. Wobensmith, III

[57] ABSTRACT

Apparatus for processing photographic materials is disclosed and more specifically equipment for turn-around during processing of an elongated web of photographic material at the midportion of a processing operation, the web being guided in part by inner and outer rollers with endless belts for guiding the web in an arcuate path.

6 Claims, 3 Drawing Figures

APPARATUS FOR PROCESSING PHOTOGRAPHIC MATERIALS

BACKGROUND OF THE INVENTION

1. Field of the Invention

This invention relates to apparatus for processing photographic materials.

BACKGROUND OF THE PRIOR ART

It has heretofore been proposed to provide roller transport apparatus for processing photographic materials in web form in tanks containing chemicals in solution and washing liquid, and in which the web is moved downwardly in the tank, then, at or near the bottom of the tank is turned and moved upwardly for delivery to another tank or for drying. One of the problems which has been encountered is in the turnaround at the bottom of the tank.

It has been proposed, as part of the turnaround apparatus, to provide fixed guide plates or shoes, as shown in the U.S. patents to Kunz, U.S. Pat. No. 3,072,310; Hope et al., U.S. Pat. Nos. 3,532,048, 3,656,676 and 3,952,610. Such guide plates have a tendency to scratch or streak the web being processed.

It has also been proposed, as part of the turnaround apparatus to guide the web with rollers as shown in the U.S. patents to Kunz, U.S. Pat. No. 3,067,919; Russell et al., U.S. Pat. Nos. 3,025,779 and 3,147,090; and Krehbiel, 3,345,928; Hope et al., 3,952,610, 3,989,176, 4,026,451, 4,079,635 and 4,118,998. With the use of such guide rollers it is important that the centers of the shafts be properly located to provide a smooth advance of the web with avoidance of scratching of the web. The use of nip rollers is troublesome because of the difficulty in maintaining constant pressure on the web to avoid slipping because of insufficient pressure and to avoid pinching and bruising which can occur with excessive pressure.

SUMMARY OF THE INVENTION

In accordance with the invention the turnaround apparatus includes guide rollers for engaging the web and carrying endless belts which upon contact with a leading edge of the web and of the web itself facilitate the advance of that edge and the web which follows.

It is the principal object of the invention to provide improved apparatus for processing photographic material in web form and more specifically the turnaround at the bottom of the processing tank by the use of endless belts which aid in the advance of the leading edge of a web and of the web itself.

It is a further object of the invention to provide improved apparatus for processing photographic material in web form by the use of endless belts which are operated from the driving mechanism of the rollers which deliver the web to the turnaround and advance it therefrom.

It is a further object of the invention to provide apparatus of the character aforesaid with which improved handling of the web is effected.

It is a further object of the invention to provide a turnaround for web processing with which the likelihood of damage to the web during processing is greatly reduced.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof, in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF A PREFERRED EMBODIMENT

Referring now more particularly to the drawings, end frames 15 and 16 are shown, of any suitable material, including metal or plastic, of sufficient strength and resistant to the chemicals and liquids to which they are exposed in use. The bearings and bushings employed in the end frames 15 and 16 have been omitted in the interest of clarity.

Figure 2:
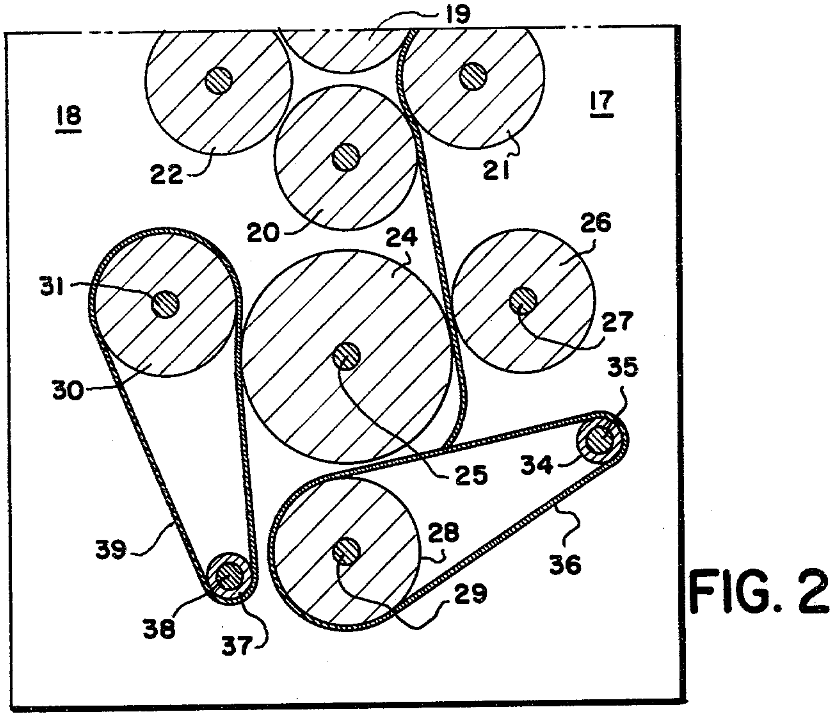
FIG. 2 is an end elevational view of the apparatus of FIG. 1 of the present invention in one of its operating positions.
Figure 3:
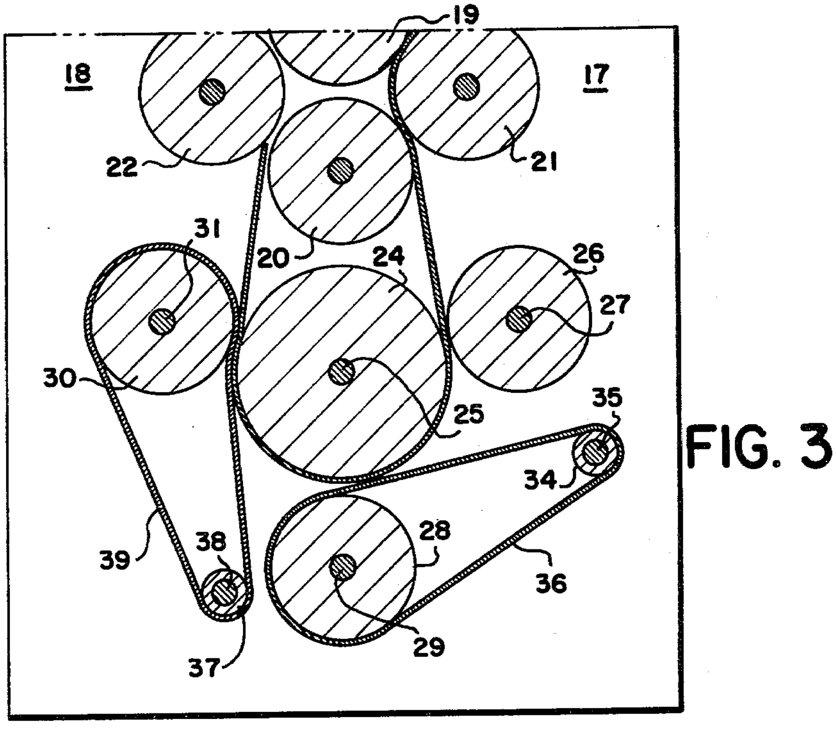
FIG. 3 is a view similar to FIG. 2 with the apparatus in another of its operating positions.

The end frames 15 and 16 are held in assembled and spaced relation in a well known manner by frame rods (not shown). The downfeed and upfeed sections of the roller transport for the web can be of well known type such as those shown in out prior U.S. Pat. Nos. 3,952,610, 4,026,451, 4,079,635 and 4,118,998. Fragmentary portions of the downfeed section 17 and upfeed section 18 are shown on FIGS. 2 and 3 as central rollers 19 and 20 rotating clockwise, a downfeed roller 21 and an upfeed roller 22 contiguous to the central rollers 19 and 20.

The turnaround at the lower part of the end frames 15 and 16 and immediately below the downfeed rollers 19, 20 and 21 and the upfeed rollers 19, 20 and 22, preferably includes a central roller 24 on a shaft 25 rotatably supported in the end frames 15 and 16 with a contiguous downfeed roller 26 on a shaft 27 carried by the end frames 15 and 16 with its center above that of the shaft 25.

Below the roller 24, a roller 28 is provided, carried on a shaft 29 journaled in the end frames 15 and 16 and in close proximity to the roller 24. Spaced from the roller 28 a roller 34 is provided carried on a shaft 35 journaled in the end frames 15 and 16. An endless belt 36 is carried on the rollers 28 and 34, the upper reach of the belt 36 being located to receive the leading edge of a web being processed from between the rollers 24 and 26 and guide that edge and the remainder of the web therealong, with contact with the periphery of the roller 24 for further advance.

A roller 30 is provided, at the same elevation as the roller 26 on a shaft 31 journaled in the end frames 15 and 16 and in close proximity to the roller 24. Spaced downwardly from the roller 30 a roller 37 is provided carried on a shaft 38 journaled in the end frames 15 and 16. An endless belt 39 is carried on the rollers 30 and 37, the inner reach of the belt 39 being located to receive the leading edge of a web being processed from between the roller 24 and the belt 36 and guide that edge and the remainder of the web therealong with contact with the periphery of the roller 24 for further advance.

Figure 1:
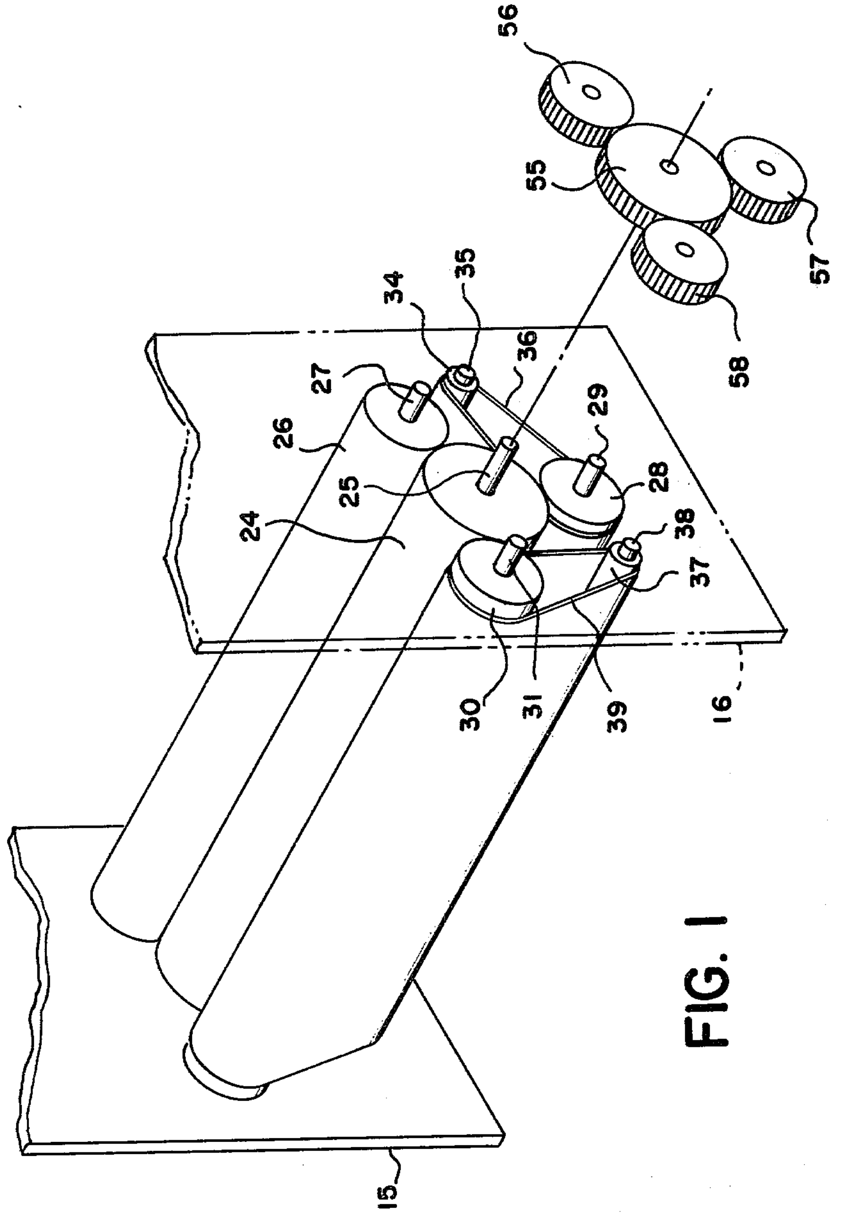
FIG. 1 is a view in perspective of one embodiment of web processing apparatus in accordance with the invention with the driving gears moved outwardly with respect to one of the side frame plates in the interest of clarity.

In order to actuate the turnaround, and as shown in FIG. 1, the shafts 25, 27, 29 and 31 have gears 55, 56, 57 and 58 secured thereto, the gears 56, 57 and 58 meshing with the gear 55, and which may be driven in any desired manner from or through the downfeed sections 17 or the upfeed section 18 or both.

The mode of operation should be apparent from the foregoing but will be summarized briefly.

The gears 55, 56, 57 and 58 are actuated to rotate the shafts 25, 27, 29 and 31.

The leading edge of a web advanced downwardly in the downfeed section 19 and guided in the turnaround by the rollers 24 and 26 and in the processing liquid therearound, advances toward the upper reach of the belt 36 where it is deflected and guided by the belt 36 into engagement with the periphery of the roller 24 at its junction with the belt 36 from which it is advanced toward the inner reach of the belt 39. Upon contact of the leading edge of the web with the inner reach of the belt 39 it is deflected upwardly, guided by the belt 36 along the periphery of the roller 24 to and beyond the junction of the belt 39 and roller 24 and therebeyond for upward movement in the upfeed section 22 of the roller transport system.

We claim:

1. In apparatus for processing photographic material by conveying an elongated web for turnaround in a confined space comprising spaced frame members, means carried by said spaced frame members for directing the web in an arcuate path, said means comprising an endless web guiding belt for engagement by the leading edge of the web and by the web.

2. Apparatus as defined in claim 1 in which said means comprises a plurality of parallel web advancing rollers rotatably supported by said frame members.

3. Apparatus as defined in claim 2 in which one of said rollers comprises a central roller with web advancing rollers spaced arond a portion of the periphery of said central roller, at least one of said web advancing rollers having an endless belt thereon for deflecting engagement of a leading edge of a web advanced thereagainst.

4. Apparatus as defined in claim 3 in which said endless belt has a moving portion thereof substantially horizontally disposed.

5. Apparatus as defined in claim 3 in which said endless belt has a moving portion thereof substantially vertically disposed.

6. Apparatus as defined in claim 2 in which one of said rollers comprises a central roller with web advancing rollers spaced around a portion of the periphery of said central roller, a plurality of said web advancing rollers having endless belts thereon for deflecting engagement of a leading edge of a web advanced thereagainst, one of said belts having a moving portion thereof substantially horizontally disposed, and another of said belts having a moving portion thereof substantially vertically disposed.

* * * * *